(12) United States Patent
Liu et al.

(10) Patent No.: US 11,402,054 B2
(45) Date of Patent: Aug. 2, 2022

(54) SURVEYING STAND CAPABLE OF PRECISELY ADJUSTING ANGLE OF SCALE

(71) Applicant: DALIAN SENBIOR SURVEYING INSTRUMENT TECHNOLOGY CO., LTD., Dalian (CN)

(72) Inventors: Yanchun Liu, Dalian (CN); Qiang Meng, Dalian (CN)

(73) Assignee: DALIAN SENBIOR SURVEYING INSTRUMENT TECHNOLOGY CO., LTD., Dalian (CN)

( * ) Notice: Subject to any disclaimer, the term of this patent is extended or adjusted under 35 U.S.C. 154(b) by 611 days.

(21) Appl. No.: 16/081,037

(22) PCT Filed: Mar. 21, 2017

(86) PCT No.: PCT/CN2017/077522
§ 371 (c)(1),
(2) Date: Aug. 30, 2018

(87) PCT Pub. No.: WO2017/162142
PCT Pub. Date: Sep. 28, 2017

(65) Prior Publication Data
US 2019/0086021 A1 Mar. 21, 2019

(30) Foreign Application Priority Data
Mar. 21, 2016 (CN) .......................... 201610159164.8

(51) Int. Cl.
*F16M 11/16* (2006.01)
*F16M 11/08* (2006.01)
(Continued)

(52) U.S. Cl.
CPC ............. *F16M 11/08* (2013.01); *F16M 11/16* (2013.01); *F16M 11/18* (2013.01);
(Continued)

(58) Field of Classification Search
CPC ........ F16M 11/08; F16M 11/16; F16M 11/18; F16M 11/2064; F16M 11/242; F16M 11/32
(Continued)

(56) References Cited

U.S. PATENT DOCUMENTS

| 256,540 | A | * | 4/1882 | Browne | .................. F16M 11/10 248/649 |
| 1,182,881 | A | * | 5/1916 | Frye | ....................... F16M 11/16 248/180.1 |

(Continued)

*Primary Examiner* — Nkeisha Smith
(74) *Attorney, Agent, or Firm* — Li & Cai Intellectual Property Office

(57) ABSTRACT

Provided is a surveying stand capable of precisely adjusting the angle of a staff. The surveying stand comprises an annular first pedestal (1) and support legs (2) connected to the first pedestal (1). A staff fixture (3) is disposed in the first pedestal (1). A staff alignment device is connected to the first pedestal (1). The staff fixture (3) can rotate horizontally relative to the first pedestal (1). A rotation adjustment device capable of adjusting the rotation angle of the staff fixture (3) is arranged between the first pedestal (1) and the staff fixture (3). The surveying stand is easy to operate and is capable of precisely adjusting the angle of the staff.

12 Claims, 13 Drawing Sheets

(51) Int. Cl.
*F16M 11/18* (2006.01)
*F16M 11/20* (2006.01)
*F16M 11/32* (2006.01)
*G01C 15/06* (2006.01)
*F16M 11/24* (2006.01)

(52) U.S. Cl.
CPC ....... *F16M 11/2064* (2013.01); *F16M 11/242* (2013.01); *F16M 11/32* (2013.01); *G01C 15/06* (2013.01)

(58) Field of Classification Search
USPC ......... 248/186.2, 177.2, 178.1, 179.2, 180.1, 248/218.4, 219.1, 219.2, 519, 518, 523, 248/525, 526
See application file for complete search history.

(56) References Cited

U.S. PATENT DOCUMENTS

| | | | | |
|---|---|---|---|---|
| 3,051,425 A * | 8/1962 | Homrighausen | ...... | F16M 11/18 248/168 |
| 3,570,130 A * | 3/1971 | Boehm | ................. | F16M 11/16 33/295 |
| 4,290,207 A * | 9/1981 | Browning | .............. | G01C 15/00 248/187.1 |
| 4,366,940 A * | 1/1983 | Vargas | ................. | F16M 11/046 248/170 |
| 5,002,252 A * | 3/1991 | Setala | .................... | A47G 33/12 248/523 |
| 5,769,370 A * | 6/1998 | Ashjaee | ................. | F16M 11/14 248/168 |
| 6,834,839 B1 * | 12/2004 | Wilson | ................... | F16M 13/02 248/230.1 |
| 7,047,960 B2 * | 5/2006 | McCrea | ................ | F41B 5/1426 124/86 |
| 7,487,948 B2 * | 2/2009 | Gardner | ................ | G01C 15/08 248/171 |
| 7,631,842 B2 * | 12/2009 | Crain | .................... | F16B 7/1463 248/165 |
| 7,669,813 B2 * | 3/2010 | Crain | .................... | G01C 15/06 248/163.1 |
| 7,987,605 B2 * | 8/2011 | Fleenor | ................. | G01C 15/08 33/293 |
| 2002/0130230 A1 * | 9/2002 | Ursan | .................... | F16M 11/10 248/184.1 |
| 2007/0090237 A1 * | 4/2007 | Hsu | ........................ | F16M 11/32 248/178.1 |

* cited by examiner

SURVEYING STAND CAPABLE OF PRECISELY ADJUSTING ANGLE OF SCALE

BACKGROUND OF THE INVENTION

1. Field of the Invention

The present invention relates to an auxiliary surveying device; in particular, to a surveying stand that is easy to operate and is capable of precisely adjusting the angle of a staff.

2. Description of Related Art

In a geodetic or engineering survey, surveying staffs (including a level staff, a reflecting prism centering rod of a total station, a satellite positioning survey centering rod, and the like) need to be vertically placed on a surveying mark point and face a surveying device such as a level gauge before the survey. That is, a vertical state of the surveying staff and its deflection angle relative to the level gauge directly affect the surveying precision. A conventional surveying stand (for example, a tripod) has a plate-shaped external pedestal, and thus is incapable of fastening a surveying staff. As a result, a surveyor needs to hold the surveying staff That is, the surveyor adjusts the surveying staff by observing whether an air bubble in a spirit level is centered, and holds the surveying staff to make it vertical. Not only wasting time and energy, such a manner also makes it difficult to ensure precise alignment, thus reducing the surveying precision. To solve the foregoing problems, Chinese utility model patent with the patent number of 201220373858.9 discloses a "clamping-type surveying stand" which changes an external pedestal of the conventional stand from a plate shape (a pan-tilt structure) to an annular shape (a clamping-type structure). This invention provides a surveying stand dedicated to a surveying staff for the first time, improving verticalness precision of the surveying staff Chinese invention patent No. 201310022381.9 discloses a "holding-type surveying stand" which makes an improvement to the "clamping-type surveying stand" using an orthogonal decomposition adjustment principle, to accelerate the speed of adjusting the staff for a vertical state. A specific operation process is as follows: The surveying staff is first placed in the pedestal, and is securely connected to the pedestal with a fixing and connection device; the bottom of the surveying staff is placed on a surveying mark point and the surveying staff roughly faces a level gauge; the splaying angles and the length of support legs are then adjusted, to make the erected surveying staff stable and roughly vertical; and finally fastening screws are finely adjusted to make the surveying staff precisely vertical. However, both the clamping-type surveying stand and the holding-type surveying stand have the following shortcomings when running an actual application: after achieving a vertical state through adjustment, the surveying staff usually fails to precisely face (aim at) the level gauge, and the process of staff erection and adjustment for a vertical state needs to be repeated, thus complicating the operation. If the process is not repeated, the survey cannot be conducted because the surveying staff fails to precisely face (aim at) the level gauge.

SUMMARY OF THE INVENTION

To solve the foregoing technical problems in the prior art, the present invention provides a surveying stand that is easy to operate and is capable of precisely adjusting the angle of a staff.

The technical solutions of the present invention are as follows: A surveying stand capable of precisely adjusting the angle of a staff includes: an annular first pedestal and support legs connected to the first pedestal, where a staff fixture is disposed in the first pedestal, a staff alignment device is connected to the first pedestal, the staff fixture can rotate horizontally relative to the first pedestal, and a rotation adjustment device capable of adjusting the rotation angle of the staff fixture is arranged between the first pedestal and the staff fixture.

A second pedestal is disposed inside the first pedestal, the first pedestal and the second pedestal are both of an annular shape with an opening and have the same opening orientation, and the staff alignment device is a second pedestal leveling device connected to the first pedestal.

The second pedestal leveling device is formed by two mutually perpendicular first horizontal screws in threaded connection with the first pedestal, and the first horizontal screws are rotatably connected to the second pedestal via a first rigid spring.

The second pedestal leveling device is arranged in such a manner that the second pedestal is connected to the first pedestal via a spring, and two mutually perpendicular first horizontal screws are in threaded connection with the first pedestal.

The second pedestal leveling device is formed by two mutually perpendicular first horizontal screws in threaded connection with the first pedestal, the front end of each first horizontal screw is connected to a horizontal slider, and the horizontal slider is disposed in a horizontal slide rail provided on an outer lateral surface of the second pedestal.

The second pedestal leveling device is formed by two mutually perpendicular horizontal pull rods slidably connected to the first pedestal, horizontal pull rod locking members are disposed on the first pedestal, and each horizontal pull rod is securely connected to the second pedestal via a first rigid spring coaxial with the horizontal pull rod.

The second pedestal leveling device is formed by a second horizontal screw in threaded connection with the first pedestal, the front end of the second horizontal screw is rotatably connected to the second pedestal, a slide way axially parallel to the second horizontal screw is disposed on the first pedestal, and the second pedestal is placed on the slide way; a third horizontal screw perpendicular to the second horizontal screw is in threaded connection with the second pedestal, and the front end of the third horizontal screw is rotatably connected to a third pedestal, the third pedestal also being of an annular shape with an opening and having the same opening orientation as the second pedestal.

There are two support legs, and the staff alignment device is a first pedestal leveling device connected to the support legs.

The first pedestal leveling device is formed by two vertical slide rails provided on outer lateral surfaces of the first pedestal respectively, vertical sliders and vertical slider locking members are disposed in each vertical slide rail, and the vertical sliders are connected to the top ends of the support legs respectively.

The first pedestal leveling device is formed by two vertical pull rods slidably connected to the first pedestal, vertical pull rod locking members are provided on the first pedestal, and one end of each vertical pull rod is rotatably connected to the top end of the corresponding support leg.

The first pedestal leveling device is formed by two vertical screws in threaded connection with the first pedestal, and one end of each vertical screw is connected to the top end of the corresponding support leg.

The first pedestal leveling device is formed by two horizontal pull rods securely connected to the first pedestal, the top ends of the support legs are sleeved to the horizontal pull rods respectively, and a horizontal pull rod locking member is disposed on each sleeve joint.

The first pedestal leveling device is formed by two horizontal screws rotatably connected to the first pedestal, and the top ends of the support legs are in threaded connection with the horizontal screws respectively.

The staff fixture is disposed inside the second pedestal and is rotatably connected to the second pedestal via a vertical shaft, and the rotation adjustment device is formed by a fastening screw and a spring connecting the second pedestal and the staff fixture, the fastening screw being in threaded connection with the second pedestal and its front end being located between the second pedestal and the staff fixture.

The staff fixture is disposed inside the second pedestal and is rotatably connected to the second pedestal via a vertical shaft, and the rotation adjustment device is formed by a fastening screw in threaded connection with the second pedestal, the fastening screw being rotatably connected to the staff fixture via a second rigid spring.

The rotation adjustment device is formed by a handle disposed on one end of the second pedestal at its inner side and a gear connected to the handle; a curved slide vane is provided on a side opposite to the gear inside the second pedestal; and outer sides of the staff fixture are respectively provided with a curved rack capable of meshing with the gear and a curved slide rail matching the curved slide vane.

The staff fixture is disposed inside the first pedestal and is rotatably connected to the first pedestal via a vertical shaft, and the rotation adjustment device is formed by a fastening screw and a spring connecting the first pedestal and the staff fixture, the fastening screw being in threaded connection with the first pedestal and its front end being located between the first pedestal and the staff fixture.

The staff fixture is disposed inside the first pedestal and is rotatably connected to the first pedestal via a vertical shaft, and the rotation adjustment device is formed by a fastening screw in threaded connection with the first pedestal, the fastening screw being rotatably connected to the staff fixture via a second rigid spring.

The rotation adjustment device is formed by a handle disposed on one end of the first pedestal at its inner side and a gear connected to the handle; a curved slide vane is provided on a side opposite to the gear inside the first pedestal; and outer sides of the staff fixture are respectively provided with a curved rack capable of meshing with the gear and a curved slide rail matching the curved slide vane.

DETAILED DESCRIPTION OF THE PREFERRED EMBODIMENTS

Embodiment 1

Figure 1:
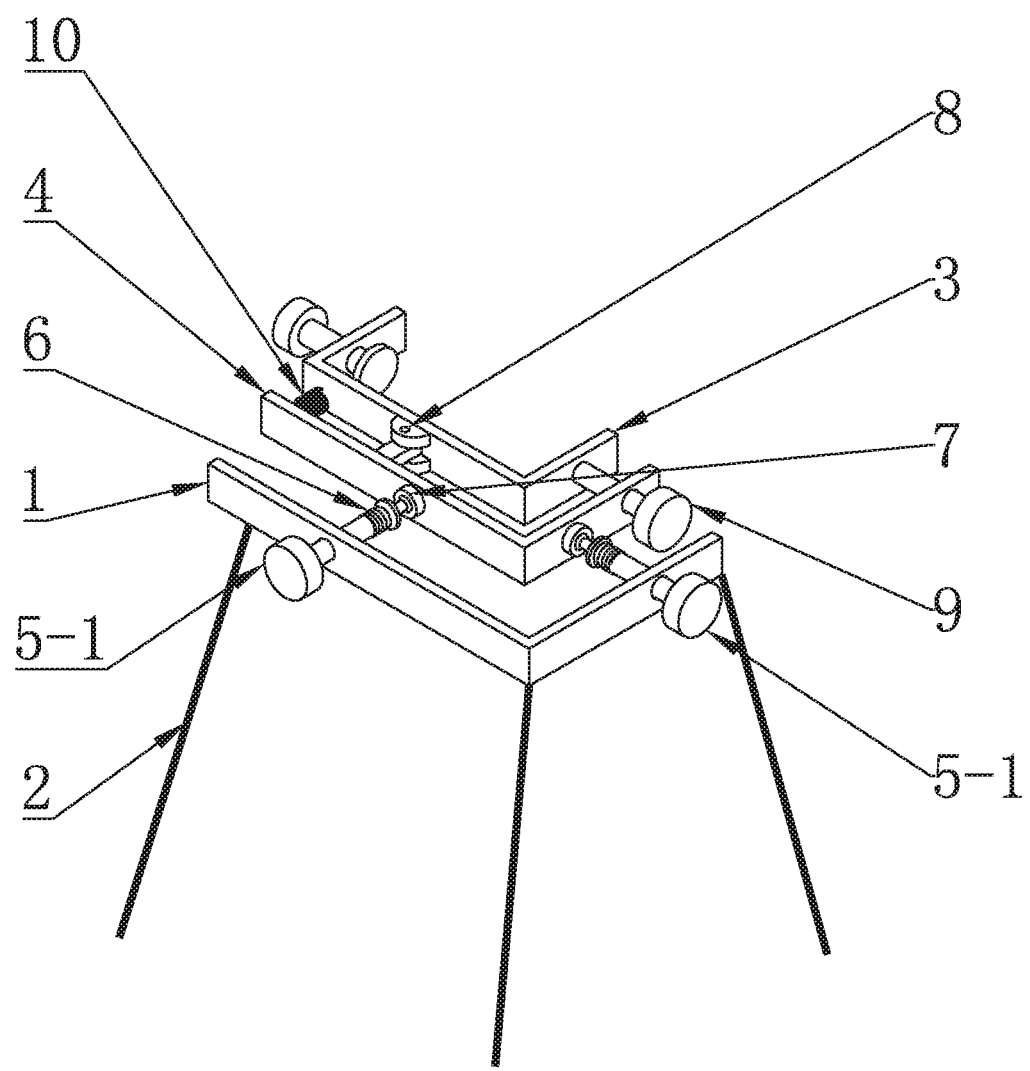
FIG. 1 is a schematic structural diagram of Embodiment 1 of the present invention.

As shown in FIG. 1, same as the prior art, this embodiment of the present invention also has a first pedestal 1 and support legs 2 connected to the first pedestal 1. The first pedestal 1 is of a rectangle shape (L-shaped) with an opening, a staff fixture 3 for securing a staff is disposed inside the first pedestal 1, and a staff alignment device (for adjusting the staff to make it vertical) is connected to the first pedestal 1. Different from the prior art, the present invention enables the staff fixture 3 to horizontally rotate with respect to the first pedestal 1. A rotation adjustment device capable of adjusting the rotation angle of the staff fixture 3 is arranged between the first pedestal 1 and the staff fixture 3. A second pedestal 4 is disposed inside the first pedestal 1. The first pedestal 1 and the second pedestal 4 are both of an annular shape with an opening and have the same opening orientation. The staff alignment device is a second pedestal leveling device connected to the first pedestal 1. A staff alignment principle thereof is as follows: After the support legs 2 are anchored to the ground and the first pedestal 1 is kept stable, the second pedestal 4 is made horizontal by using the second pedestal leveling device, and simultaneously the staff securely connected to the second pedestal 4 and the staff fixture 3 achieves a vertical state. In this embodiment, the second pedestal leveling device is formed by two mutually perpendicular first horizontal screws 5-1 in threaded connection with the first pedestal 1. Each first horizontal screw 5-1 is connected to a first end part 7 via a first rigid spring 6 coaxial with the first horizontal screw 5-1. The first end parts 7 are rotatably connected to the second pedestal 4, such that each first horizontal screw 5-1 can rotate with respect to the second pedestal 4 while connected to it via the first rigid spring 6 and the first end part 7. The staff fixture 3 is of an annularly rectangular shape (U-shaped ring) also with an opening of which the orientation is identical with that of the first pedestal 1. The rectangle is provided with a fastener for securing the staff on one or two sides. The staff fixture 3 is disposed inside the second pedestal 4 and is rotatably connected to the second pedestal 4 via a vertical shaft 8. In Embodiment 1, the vertical shaft 8 is located between the outer side of the staff fixture 3 and the inner side of the second pedestal 4, and therefore a rotation gap should be provided between the staff fixture 3 and the second pedestal 4. The rotation adjustment device is formed by a fastening screw 9 and a spring 10 connecting the second pedestal 4 and the staff fixture 3, where the fastening screw 9 is in threaded connection with the second pedestal 4 and its front end is located between the second pedestal 4 and the staff fixture 3. The spring 10 is a pressure spring.

Figure 2:
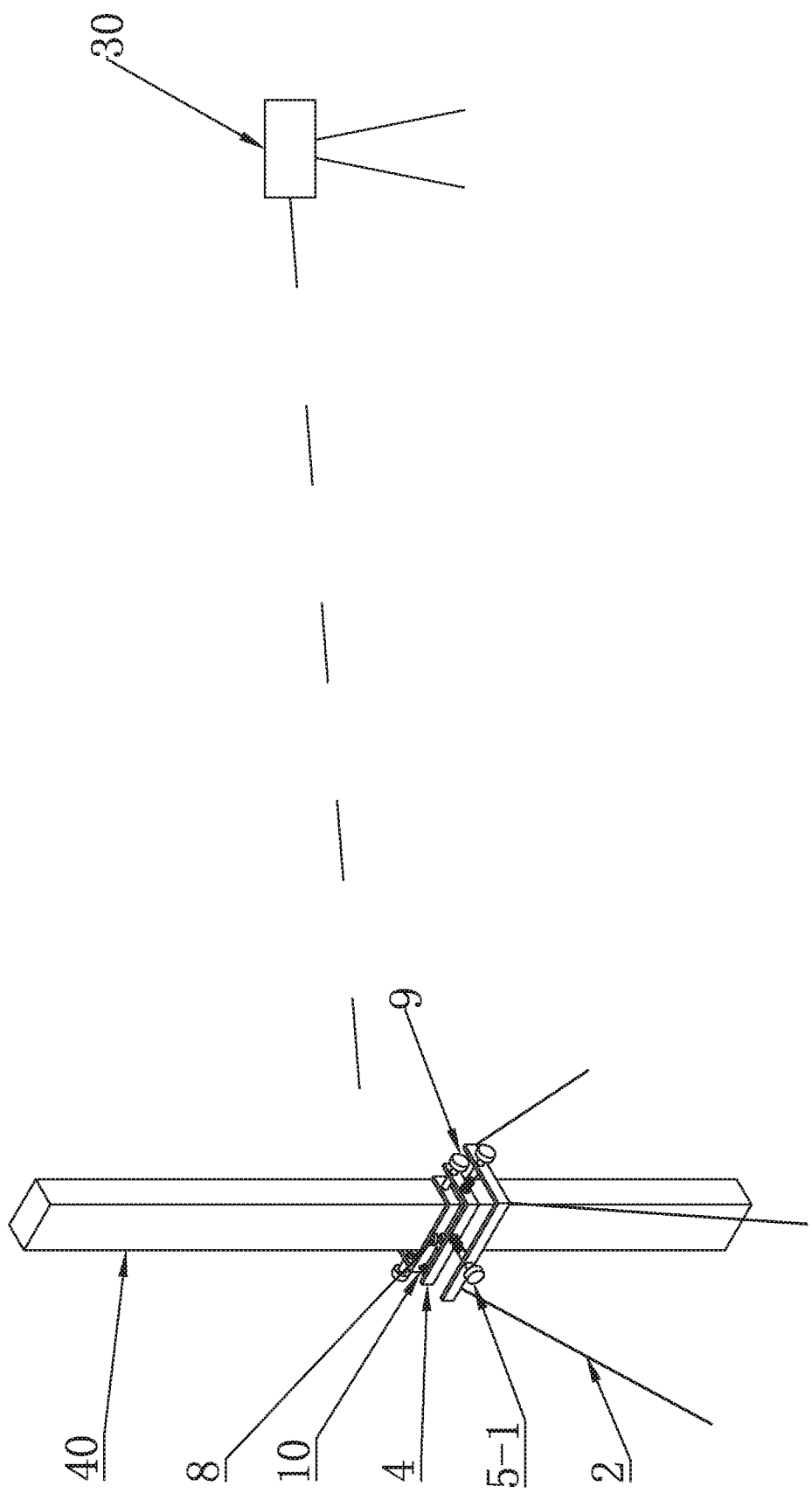
FIG. 2 is a diagram showing an effect after use of an embodiment of the present invention.

A working process of Embodiment 1 of the present invention is shown in FIG. 2. A surveying staff 40 is placed in the staff fixture 3 and is secured by the fastener. The bottom of the surveying staff 40 is placed on a leveling mark point so that the surveying staff 40 roughly faces a level gauge 30. The surveying staff 40 can be made stable and roughly vertical by adjusting splaying angles and length of the three support legs 2, and then by fine adjustment of the first horizontal screws 5-1 and with the second pedestal 4, the surveying staff 40 is made precisely vertical. Afterwards, the fastening screws 9 are finely adjusted so that the vertical staff 40 rotates about the shaft 8. Under the joint effect of the fastening screw 9 and the spring 10, the surveying staff 40 can be made to precisely face the level gauge 30.

Embodiment 2

Figure 3:
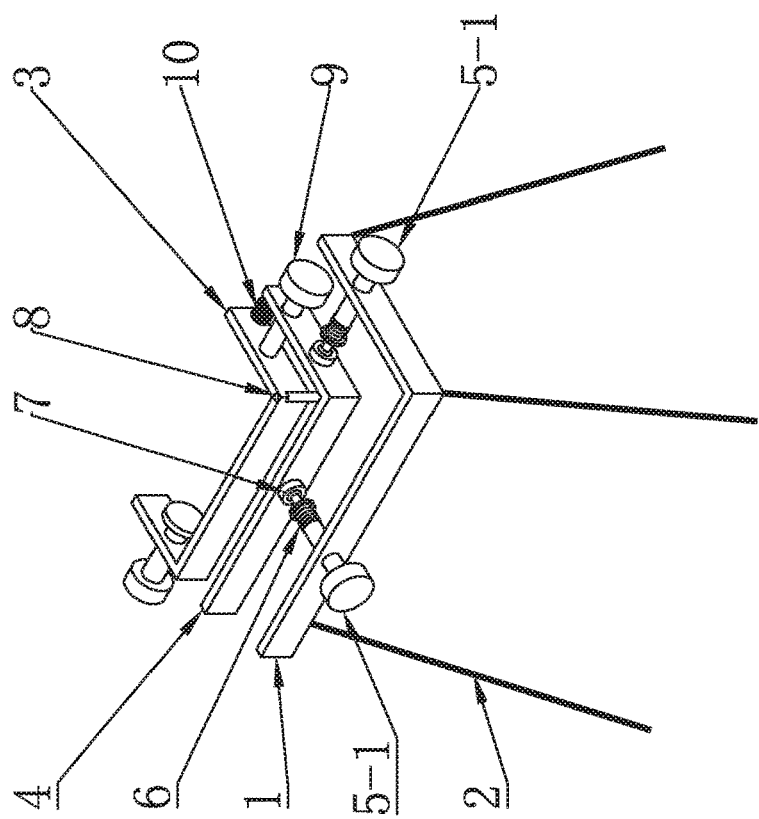
FIG. 3 is a schematic structural diagram of Embodiment 2 of the present invention.

As shown in FIG. 3, the fundamental structure of this embodiment is same as that of Embodiment 1. The difference therebetween is as follows: The vertical shaft 8 is disposed between turns of the staff fixture 3 and the second pedestal 4, and the spring 10 is a tension spring and has the same axial direction with the fastening screw 9.

A working process of Embodiment 2 is same as that of Embodiment 1.

Embodiment 3

Figure 4:
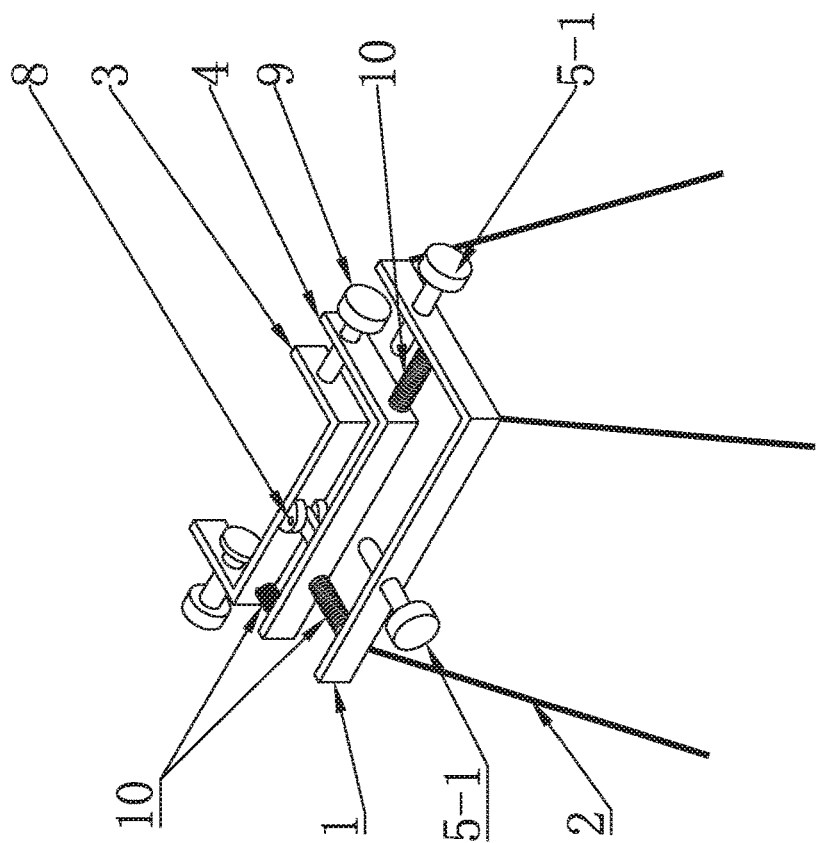
FIG. 4 is a schematic structural diagram of Embodiment 3 of the present invention.

As shown in FIG. 4, the fundamental structure of this embodiment is same as that of Embodiment 1. The difference therebetween is as follows: The second pedestal leveling device is arranged in such a manner that the second pedestal 4 is connected to the first pedestal 1 via two mutually perpendicular springs 10, and two mutually perpendicular first horizontal screws 5-1 are in threaded connection with the first pedestal 1.

A working process of Embodiment 3 is basically same as that of Embodiment 1.

Embodiment 4

Figure 5:
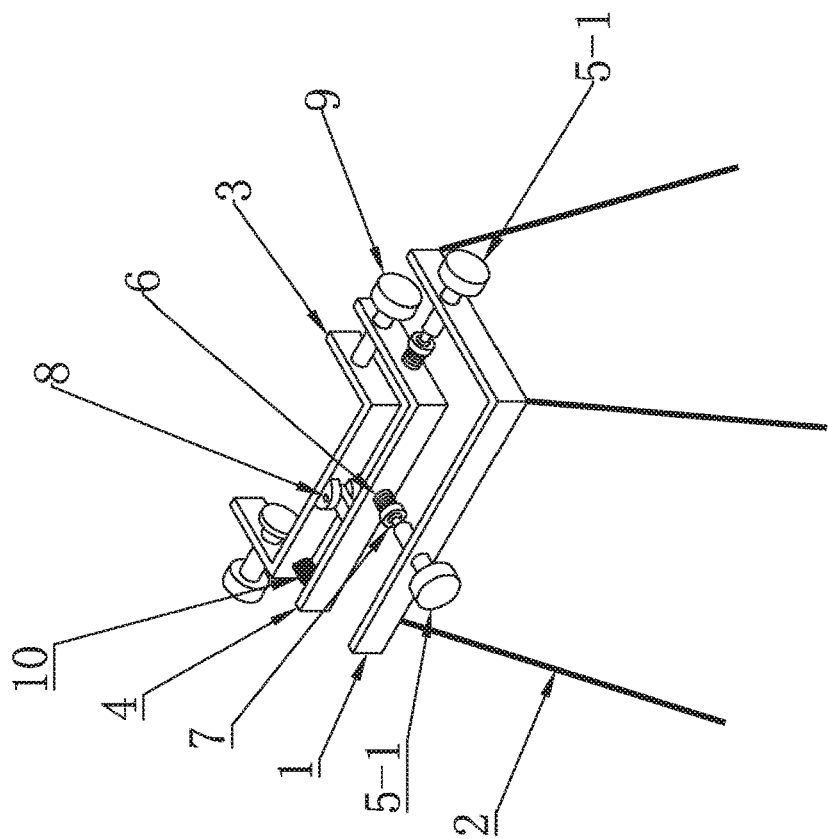
FIG. 5 is a schematic structural diagram of Embodiment 4 of the present invention.

As shown in FIG. 5, the fundamental structure of this embodiment is same as that of Embodiment 1. The difference therebetween is as follows: The second pedestal leveling device is arranged in such a manner that the second pedestal 4 is connected to the first pedestal via a spring 10 that is provided between an inner turn of the first pedestal 1 and an outer turn of the second pedestal 4, and two mutually perpendicular first horizontal screws 5-1 are in threaded connection with the first pedestal 1. The rotation adjustment device is formed by a fastening screw 9 in threaded connection with an opening end of the second pedestal 4. The fastening screw 9 is connected to a second end part 12 via a second rigid spring 11 coaxial with the fastening screw 9, and the second end part 12 is rotatably connected to the staff fixture 3.

A working process of Embodiment 4 is basically same as that of Embodiment 1.

Embodiment 5

Figure 6:
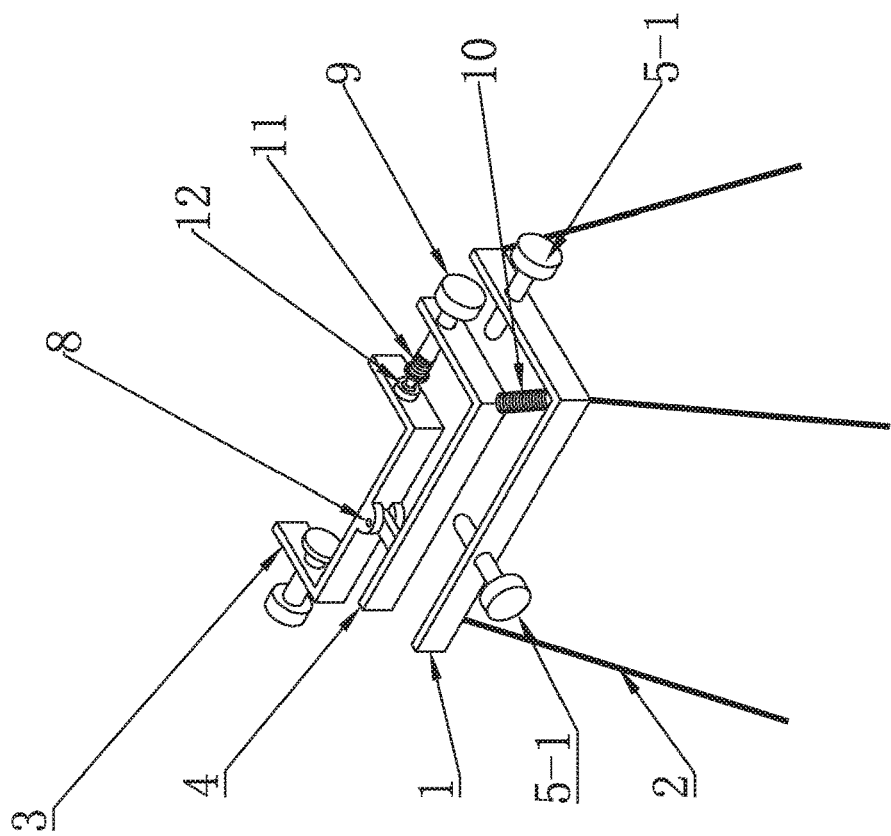
FIG. 6 is a schematic structural diagram of Embodiment 5 of the present invention.

As shown in FIG. 6, the fundamental structure of this embodiment is same as that of Embodiment 1. The difference therebetween is as follows: The second pedestal leveling device is arranged in such a manner that each first horizontal screw 5-1 is rotatably connected to the first end part 7, and the first end part 7, the first rigid spring 6 and the second pedestal 4 are securely connected successively, such that the first horizontal screw 5-1 can rotate with respect to the second pedestal 4 while connected to it via the first rigid spring 6.

A working process of Embodiment 5 is same as that of Embodiment 1.

Embodiment 6

Figure 7:
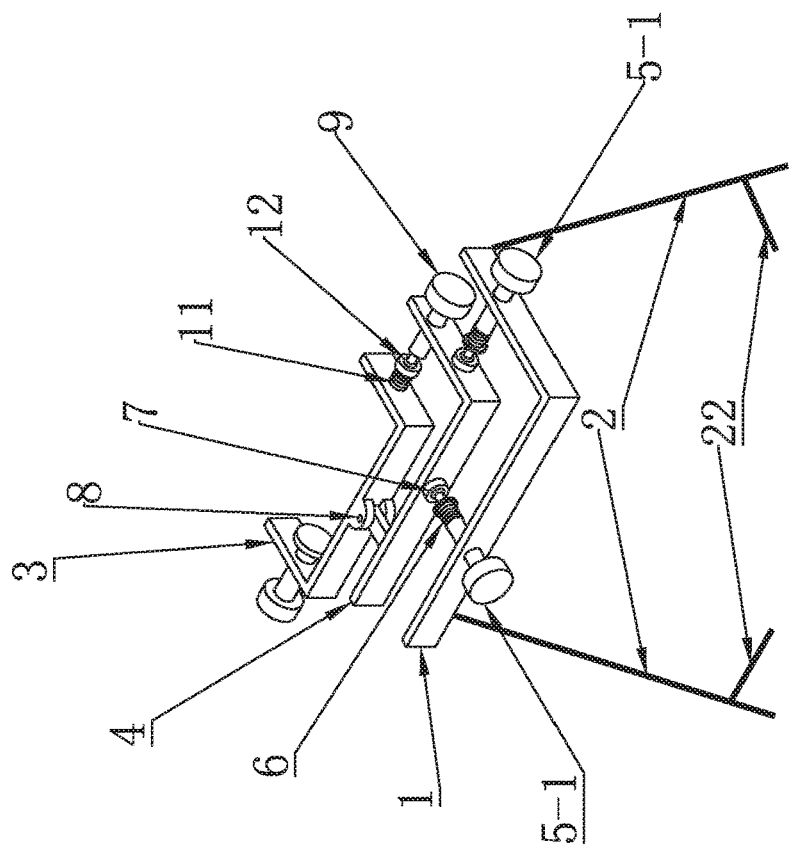
FIG. 7 is a schematic structural diagram of Embodiment 6 of the present invention.

As shown in FIG. 7, the fundamental structure of this embodiment is same as that of Embodiment 1. The difference therebetween is as follows: The first pedestal 1 is provided with two support legs 2 that are each connected with a horizontal pedal 22 on the lower end. The rotation adjustment device is formed by a fastening screw 9 in threaded connection with an opening end of the second pedestal 4, the fastening screw 9 is connected to a second end part 12 via a second rigid spring 11 coaxial with the fastening screw 9, and the second end part 12 is rotatably connected to the staff fixture 3.

A working process of Embodiment 6 is same as that of Embodiment 1. A difference lies in that, in this embodiment, a surveyor needs to step on the horizontal pedals 22 respectively disposed on the lower ends of the support legs 2.

Embodiment 7

Figure 8:
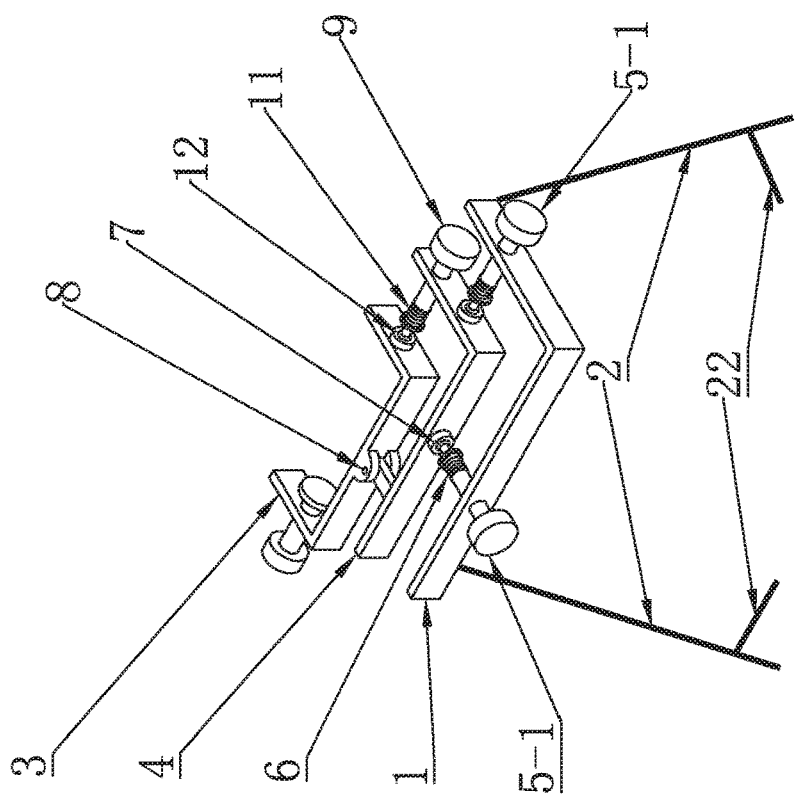
FIG. 8 is a schematic structural diagram of Embodiment 7 of the present invention.

As shown in FIG. 8, the fundamental structure of this embodiment is same as that of Embodiment 6. The difference therebetween is as follows: The rotation adjustment device is formed by a fastening screw 9 in threaded connection with an opening end of the second pedestal 4, the fastening screw 9 is rotatably connected to the second end part 12, and the second end part 12, the second rigid spring 11 coaxial with the fastening screw 9, and the staff fixture 3 are securely connected successively, such that the fastening screw 9 can rotate with respect to the staff fixture 3 while connected to it via the second rigid spring 11.

A working process of Embodiment 7 is same as that of Embodiment 6.

Embodiment 8

Figure 9:
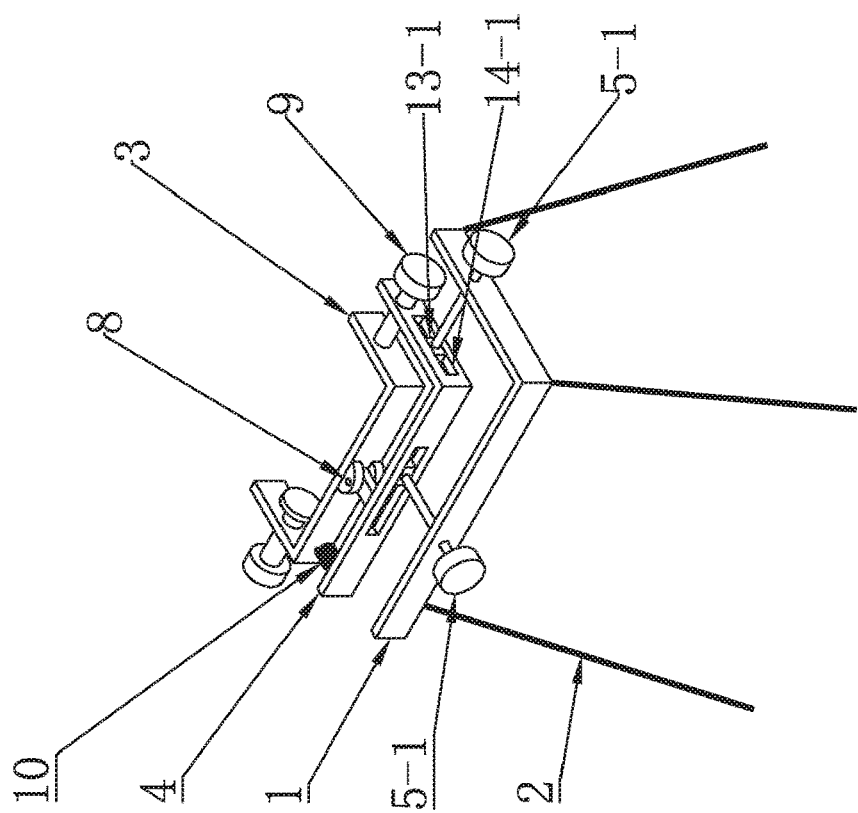
FIG. 9 is a schematic structural diagram of Embodiment 8 of the present invention.

As shown in FIG. 9, the fundamental structure of this embodiment is same as that of Embodiment 1. The difference therebetween is as follows: The second pedestal leveling device is arranged in such a manner that the front end of each horizontal screw 5-1 is connected to a horizontal slider 13-1, and the horizontal slider 13-1 is disposed in a horizontal slide rail 14-1 provided on an outer lateral surface of the second pedestal 4.

A working process of Embodiment 8 is same as that of Embodiment 1.

Embodiment 9

Figure 10:
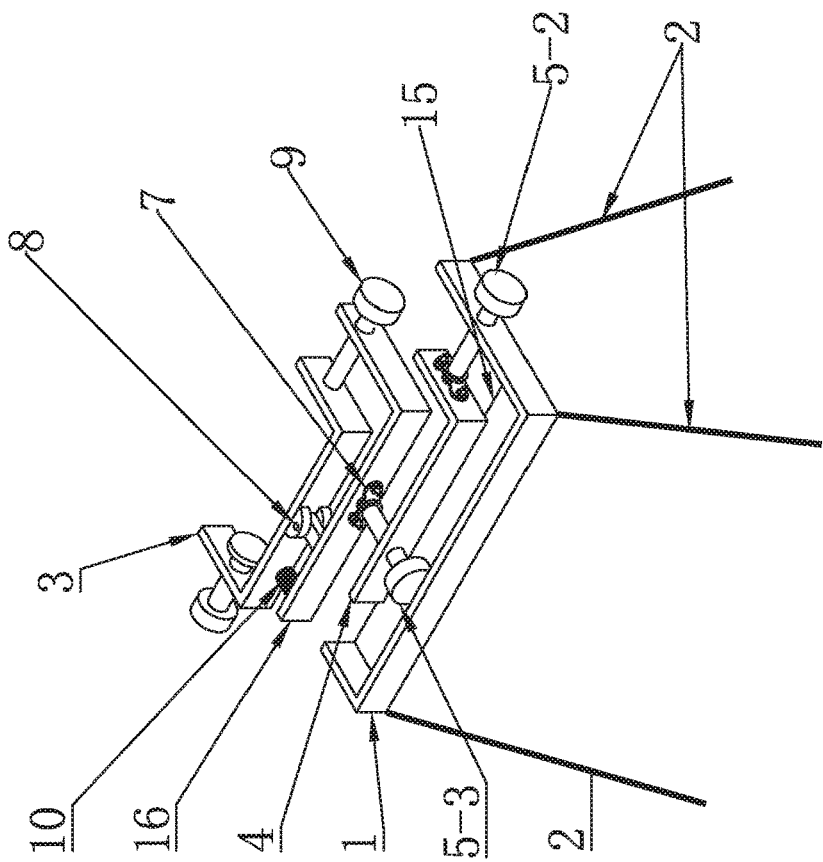
FIG. 10 is a schematic structural diagram of Embodiment 9 of the present invention.

As shown in FIG. 10, the fundamental structure of this embodiment is same as that of Embodiment 1. The difference therebetween is as follows: The second pedestal leveling device is formed by a second horizontal screw 5-2 in threaded connection with the first pedestal 1, the front end of the second horizontal screw 5-2 is rotatably connected to the second pedestal 4, a slide way 15 axially parallel to the second horizontal screw 5-2 is disposed on the first pedestal 1, and the second pedestal 4 is placed on the slide way 15; a third horizontal screw 5-3 perpendicular to the second horizontal screw 5-2 is in threaded connection with the second pedestal 4, and the front end of the third horizontal screw 5-3 is rotatably connected to a third pedestal 16, the third pedestal 16 also being of a rectangle shape with an opening and having the same opening orientation as the second pedestal 4. The staff fixture 3 is disposed inside the third pedestal 16 and is rotatably connected to the third pedestal 16 via the vertical shaft 8. The rotation adjustment device is formed by a fastening screw 9 and a spring 10 connecting the third pedestal 16 and the staff fixture 3, where the fastening screw 9 is in threaded connection with the third pedestal 16 and its front end is located between the third pedestal 16 and the staff fixture 3.

A working process of Embodiment 9 is basically same as that of Embodiment 1. A difference lies in that, the second horizontal screw 5-2 and the third horizontal screw 5-3 can be successively adjusted, such that the surveying staff 40 achieves a vertical state.

Embodiment 10

Figure 12:
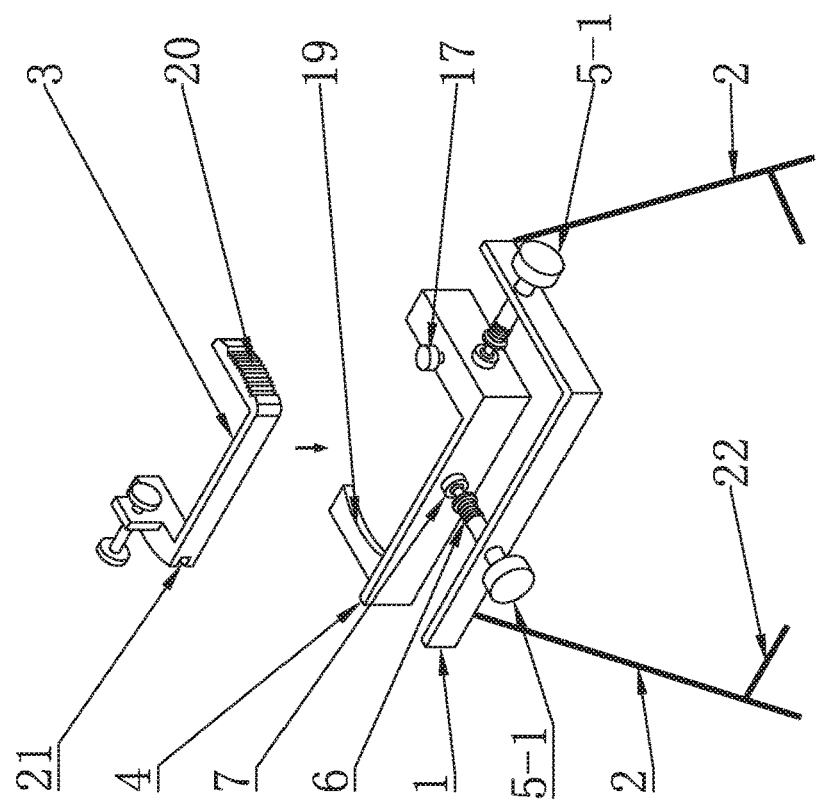
FIGS. 11 and 12 are schematic structural diagrams of Embodiment 10 of the present invention.
Figure 11:
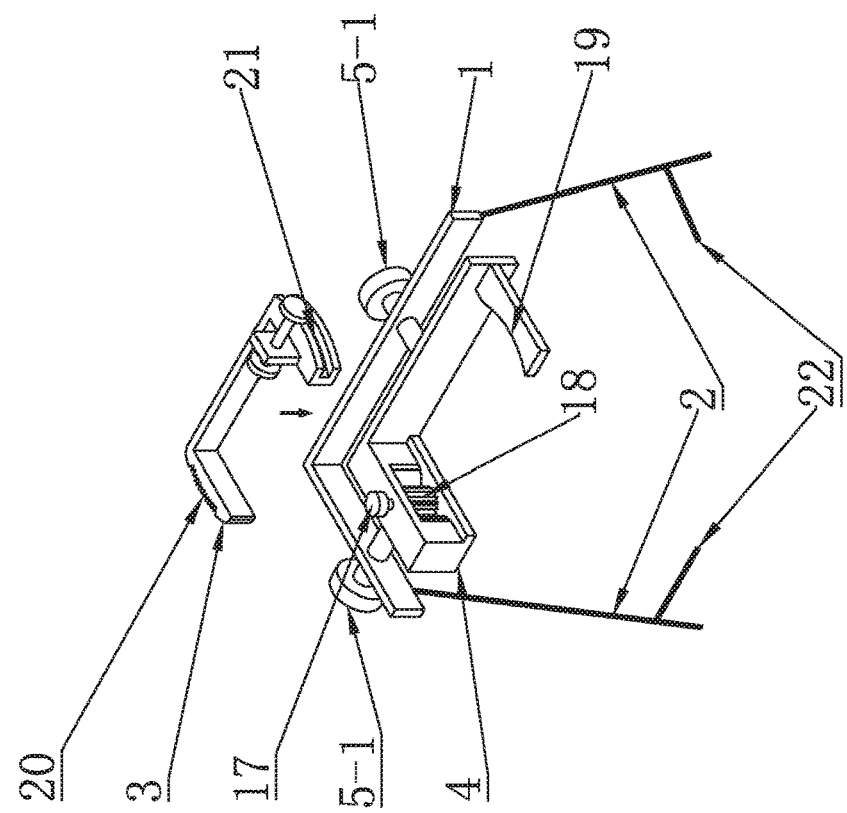

As shown in FIGS. 11 and 12, the fundamental structure of this embodiment is same as that of Embodiment 1. The difference therebetween is as follows: The rotation adjustment device is formed by a handle 17 disposed on one end of the second pedestal 4 at its inner side and a gear 18 connected to the handle 17. A curved slide vane 19 is provided on a side opposite to the gear 18 inside the second pedestal 4. Outer sides of the staff fixture 3 are respectively provided with a curved rack 20 capable of meshing with the gear 18 and a curved slide rail 21 matching the curved slide vane 19. Positions of the curved slide vane 19 and the curved slide rail 21 can be swapped, provided that the staff fixture 3 can be driven by the gear 18 to rotate.

A working process of Embodiment 10 is basically same as that of Embodiment 1. A difference lies in that, the handle 17 is adjusted and turned to drive the gear 18 to rotate, and then by using the staff fixture 3, the vertical surveying staff 40 is turned to precisely face the level gauge 30.

Embodiment 11

Figure 13:
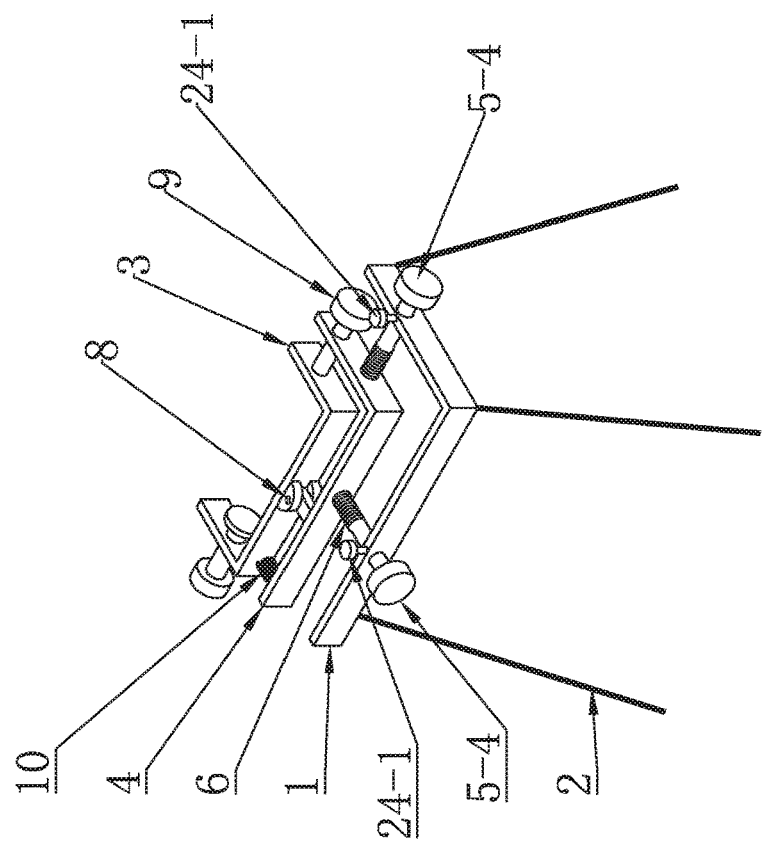
FIG. 13 is a schematic structural diagram of Embodiment 11 of the present invention.

As shown in FIG. 13, the fundamental structure of this embodiment is same as that of Embodiment 1. The difference therebetween is as follows: The second pedestal leveling device is formed by two mutually perpendicular horizontal pull rods 5-4 slidably connected to the first pedestal 1, horizontal pull rod locking members 24-1 are disposed on the first pedestal 1, and each horizontal pull rod 5-4 is securely connected to the second pedestal 4 via a first rigid spring 6 coaxial with the horizontal pull rod 5-4, such that the horizontal pull rod 5-4 can be securely connected to the second pedestal 4 via the first rigid spring 6, and can also be axially moved with respect to the first pedestal 1.

A working process of Embodiment 11 is basically same as that of Embodiment 1. A difference lies in that, after the surveying staff 40 is made stable and roughly vertical by adjusting the splaying angles and the length of the support legs 2, the positions of the horizontal pull rods 5-4 on the first pedestal 1 are finely adjusted, such that the surveying staff 40 achieves a vertical state; and then the horizontal pull rod locking members 24-1 are tightly locked to make the surveying staff 40 precisely face the level gauge 30.

Embodiment 12

Figure 14:
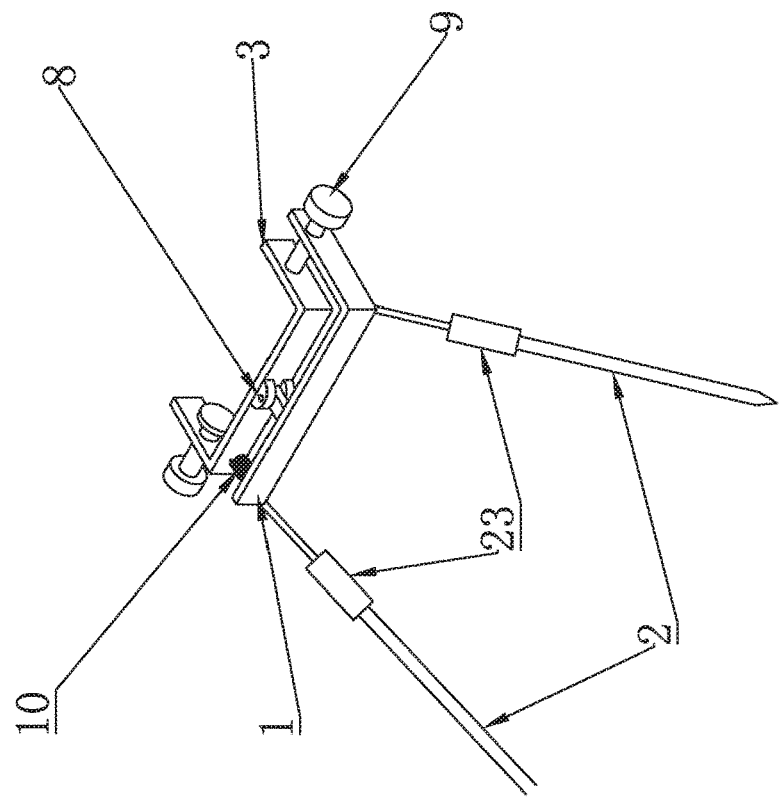
FIG. 14 is a schematic structural diagram of Embodiment 12 of the present invention.

As shown in FIG. 14, same as the prior art, this embodiment also has a first pedestal 1 and two support legs 2 connected to the first pedestal 1. The first pedestal 1 is of a rectangle shape with an opening, a staff fixture 3 for securing a staff is disposed inside the first pedestal 1, and a staff alignment device is connected to the first pedestal 1. Different from the prior art, the staff alignment device of this embodiment is a first pedestal leveling device connected to the support legs 2. The first pedestal leveling device has multiple forms, and no matter which form is taken, the leveling device can cooperate with the support legs 2 to make the first pedestal horizontal. The first pedestal leveling device of this embodiment is formed by leg length adjustment devices 23 respectively connected to the support legs 2. The leg length adjustment device may be a bushing slide structure or threaded screwing structure, and may be connected on the top end, middle part, or lower end of each support leg. The staff fixture 3 is of an annularly rectangular shape also with an opening. The rectangle is provided with a fastener for securing the staff on one or two sides. The staff fixture 3 is disposed inside the first pedestal 1 and is rotatably connected to the first pedestal 1 via a vertical shaft 8. A rotation gap should be provided between the staff fixture 3 and the first pedestal 1. The rotation adjustment device is formed by a fastening screw 9 and a spring 10 connecting the first pedestal 1 and the staff fixture 3, where the fastening screw 9 is in threaded connection with the first pedestal 1 and its front end is located between the first pedestal 1 and the staff fixture 3. The spring 10 is a pressure spring.

Figure 15:
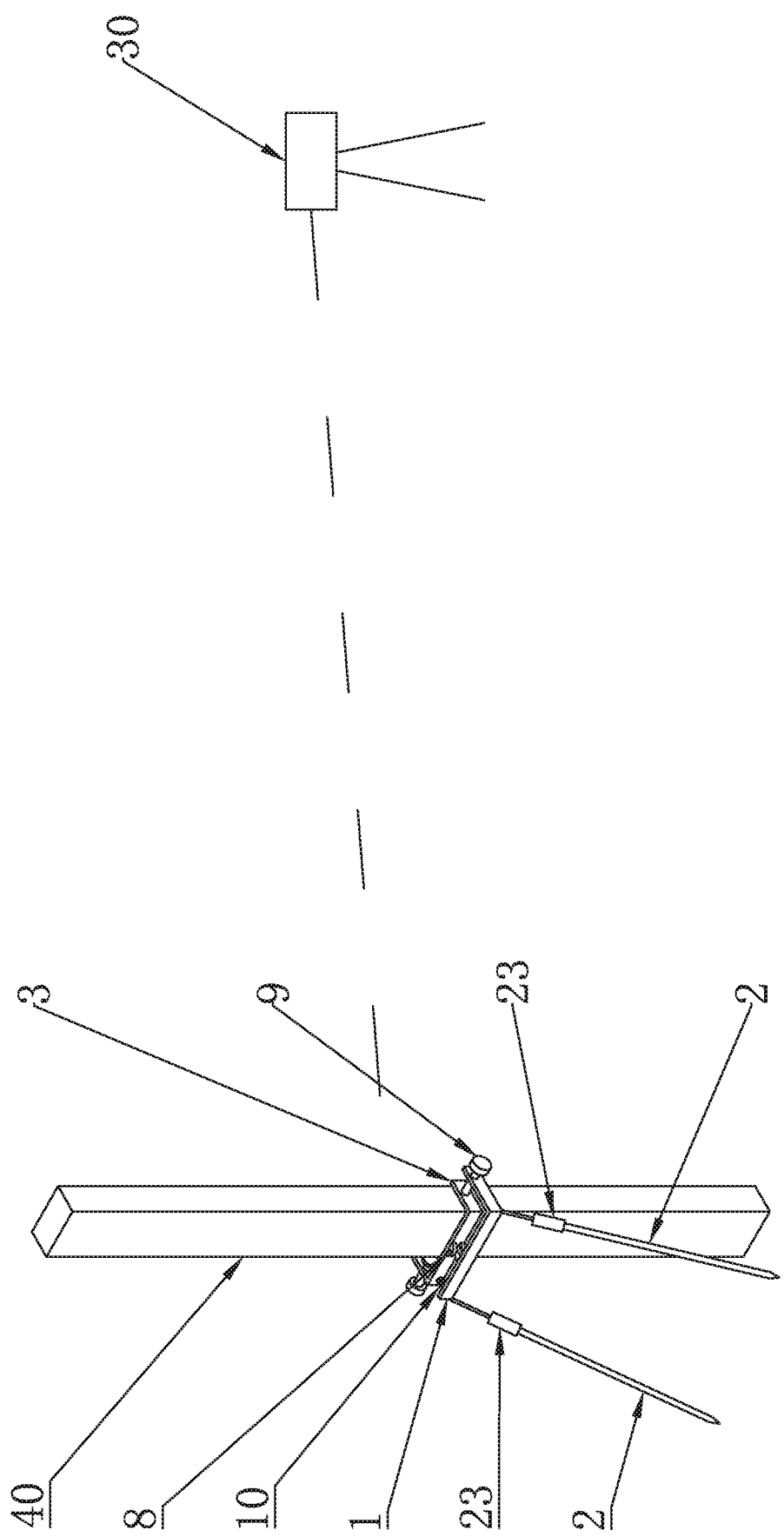
FIG. 15 is a diagram showing an effect after use of Embodiment 12 of the present invention.

A working process is shown in FIG. 15. A surveying staff 40 is placed in the staff fixture 3 and is secured by the fastener. The bottom of the surveying staff 40 is placed on a leveling mark point so that the surveying staff 40 roughly faces a level gauge 30. The surveying staff 40 can be made stable and roughly vertical by adjusting splaying angles and length of the two support legs 2. Then, the first pedestal 1 is made horizontal by using the first pedestal leveling device and the support legs 2, such that the surveying staff 40 securely connected to the first pedestal 1 and the staff fixture 3 achieves a vertical state. Afterwards, the fastening screws 9 are finely adjusted so that the vertical staff 40 rotates about the shaft 8 (rotates with respect to the first pedestal 1). Under the joint effect of the fastening screws 9 and the spring 10, the surveying staff 40 can be made to precisely face the level gauge 30.

Embodiment 13

Figure 16:
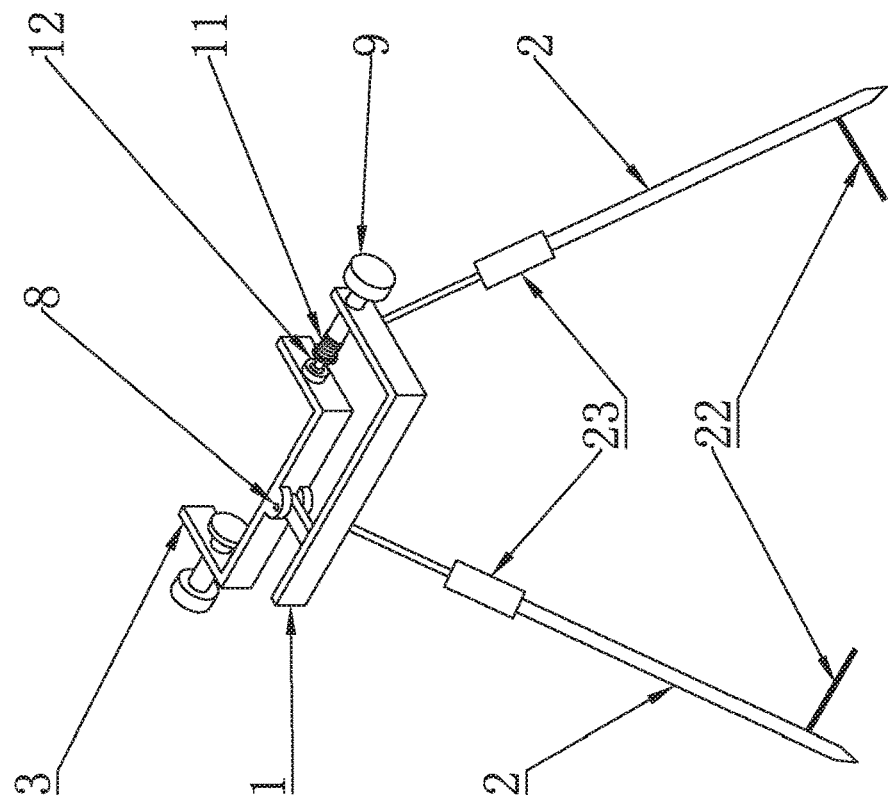
FIG. 16 is a schematic structural diagram of Embodiment 13 of the present invention.

As shown in FIG. 16, the fundamental structure of this embodiment is same as that of Embodiment 12. The difference therebetween is as follows: There are two support legs 2 which are orthogonally disposed (that is, after the two support legs are splayed, their projections on the horizontal plane are perpendicular to each other), and horizontal pedals 22 are connected on the lower ends of the support legs 2 respectively. The staff fixture 3 is disposed inside the first pedestal 1 and is rotatably connected to the first pedestal 1 via the vertical shaft 8. The rotation adjustment device is formed by a fastening screw 9 in threaded connection with an opening end of the first pedestal 1. The fastening screw 9 is connected to a second end part 12 via a second rigid spring 11 coaxial with the fastening screw 9, and the second end part 12 is rotatably connected to the staff fixture 3.

A working process of Embodiment 13 is basically same as that of Embodiment 12. A difference lies in that, in this embodiment, a surveyor needs to step on the horizontal pedals 22 respectively disposed on the lower ends of the support legs 2, thus facilitating the operation.

Embodiment 14

Figure 17:
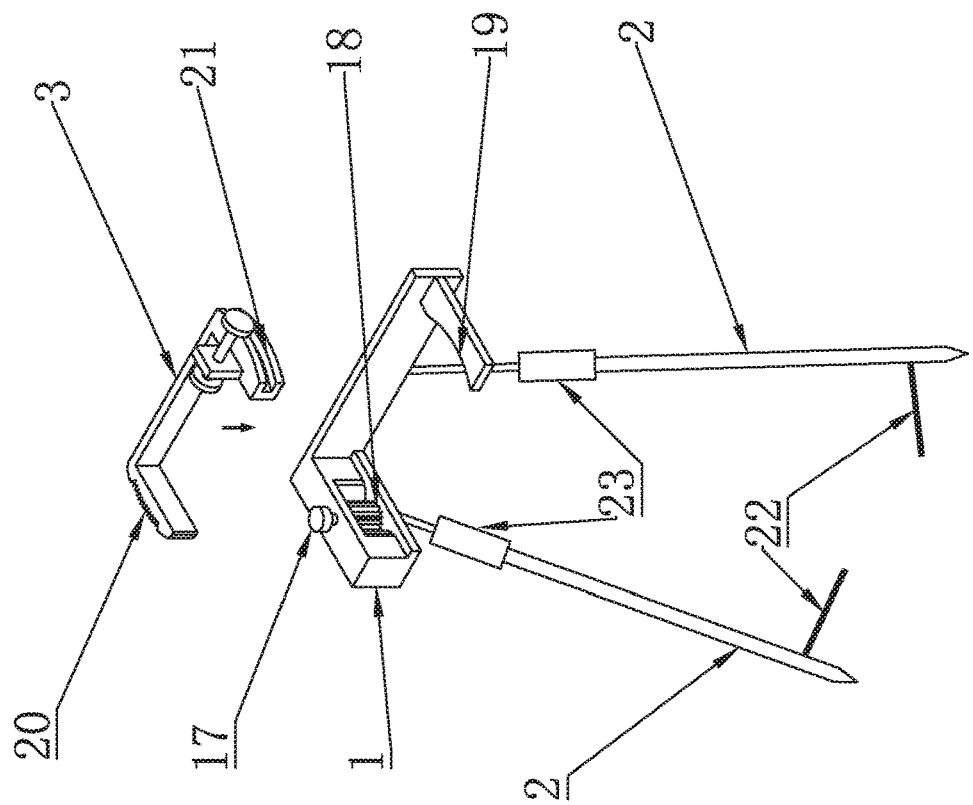
FIG. 17 is a schematic structural diagram of Embodiment 14 of the present invention.

As shown in FIG. 17, the fundamental structure of this embodiment is same as that of Embodiment 13. The difference therebetween is as follows: The rotation adjustment device is formed by a handle 17 disposed on one end of the first pedestal 1 at its inner side and a gear 18 connected to the handle 17. A curved slide vane 19 is provided on a side opposite to the gear 18 inside the first pedestal 1. Outer sides of the staff fixture 3 are respectively provided with a curved rack 20 capable of meshing with the gear 18 and a curved slide rail 21 matching the curved slide vane 19. Positions of the curved slide vane 19 and the curved slide rail 21 can be swapped, provided that the staff fixture 3 can be driven by the gear 18 to rotate.

A working process of Embodiment 14 is basically same as that of Embodiment 13. A difference lies in that, the handle 17 is adjusted and turned to drive the gear 18 to rotate, and then by using the staff fixture 3, the vertical surveying staff 40 is turned to precisely face the level gauge 30.

Embodiment 15

Figure 18:
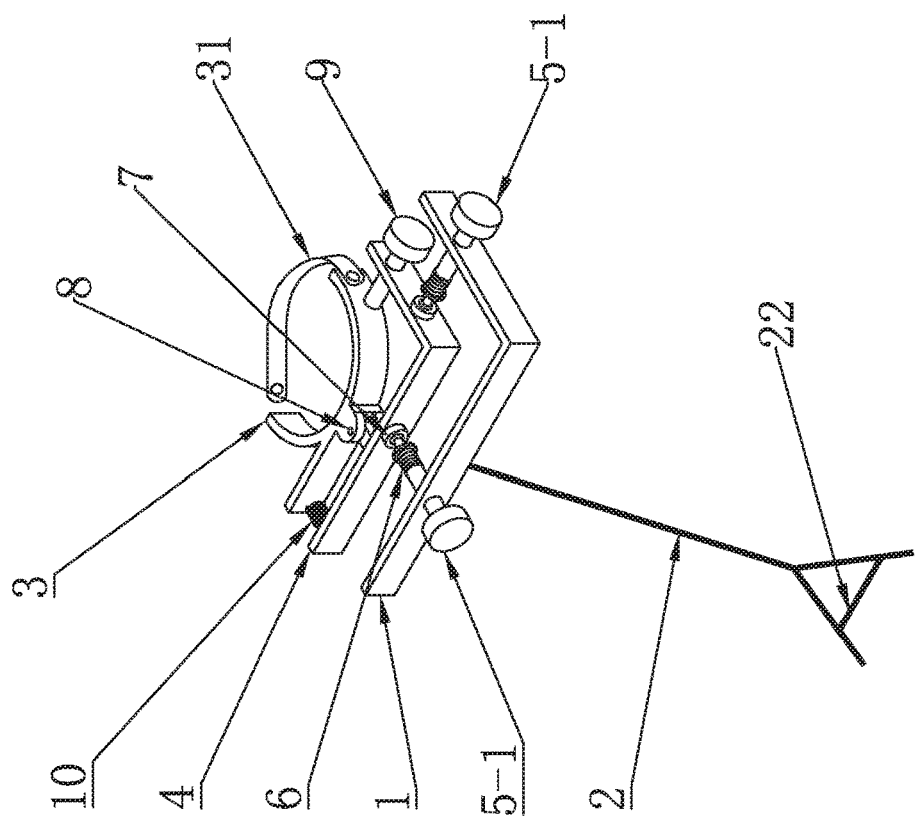
FIG. 18 is a schematic structural diagram of Embodiment 15 of the present invention.

As shown in FIG. 18, the fundamental structure of this embodiment is same as that of Embodiment 1. The difference therebetween is as follows: The first pedestal is provided with one support leg 2, and a horizontal pedal 22 is connected to the lower end of the support leg 2. The staff fixture 3 is of a semicircle shape, and a rounded surveying staff is fastened by using an elastic strap 31.

A working process of Embodiment 15 is basically same as that of Embodiment 1. A difference lies in that, in this embodiment, a surveyor does not need to step on the horizontal pedal 22 disposed on the lower end of the support leg 2.

Embodiment 16

Figure 19:
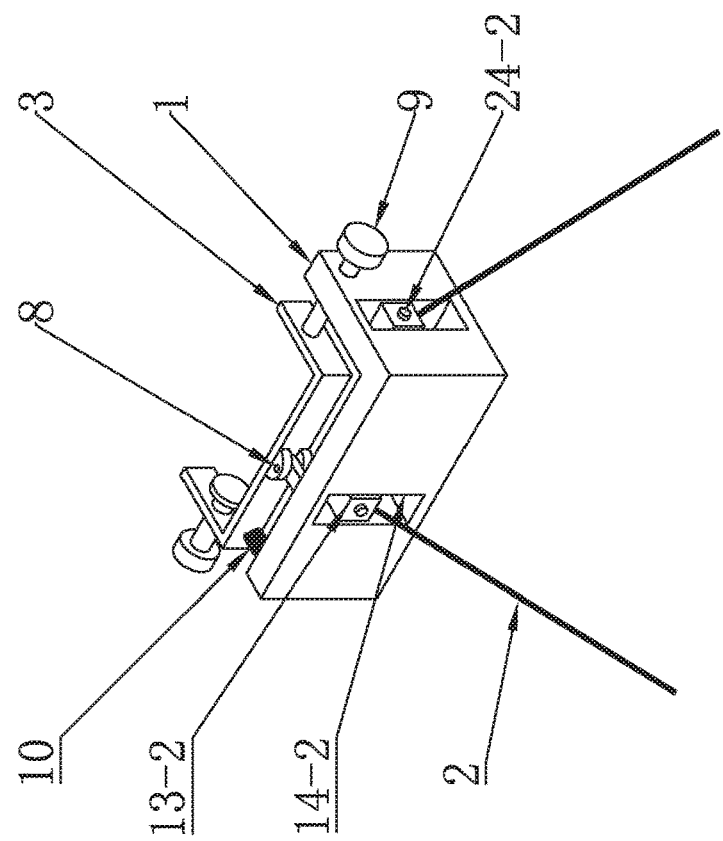
FIG. 19 is a schematic structural diagram of Embodiment 16 of the present invention.

As shown in FIG. 19, the fundamental structure of this embodiment is same as that of Embodiment 12. The difference therebetween is as follows: The first pedestal leveling device is formed by two vertical slide rails 14-2, two vertical sliders 13-2, and two vertical slider locking members 24-2 that are provided on outer sides of the first pedestal 1 respectively, where the vertical sliders 13-2 are rotatably connected to the top ends of the support legs 2 respectively.

A working process of Embodiment 16 is same as that of Embodiment 12. A difference lies in that, a distance between the top end of each support leg 2 and the first pedestal 1 is adjusted by means of fine adjustment of the vertical sliders 13-2 and the vertical slider locking members 24-2. That is, in the case where the bottom ends of the support legs 2 are anchored to the ground and the length of the support legs is fixed, the distance between the first pedestal 1 (an adjustment point) and the bottom end of each support leg 2 is adjusted, such that the surveying staff 40 achieves a vertical state.

Embodiment 17

Figure 20:
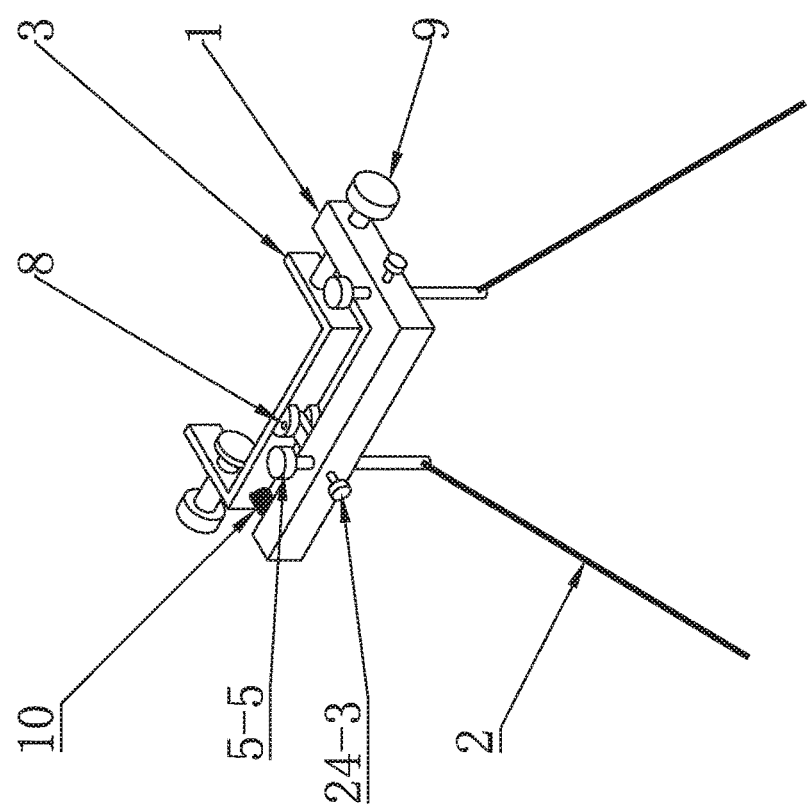
FIG. 20 is a schematic structural diagram of Embodiment 17 of the present invention.

As shown in FIG. 20, the fundamental structure of this embodiment is same as that of Embodiment 16. The difference therebetween is as follows: The first pedestal leveling device is formed by two vertical pull rods 5-5 slidably connected to the first pedestal 1, and vertical pull rod locking members 24-3 are provided on sliding joints on the first pedestal 1, where one end of each vertical pull rod 5-5 is rotatably connected to the top end of the corresponding support leg 2.

A working process of Embodiment 17 is basically same as that of Embodiment 16.

Embodiment 18

Figure 21:
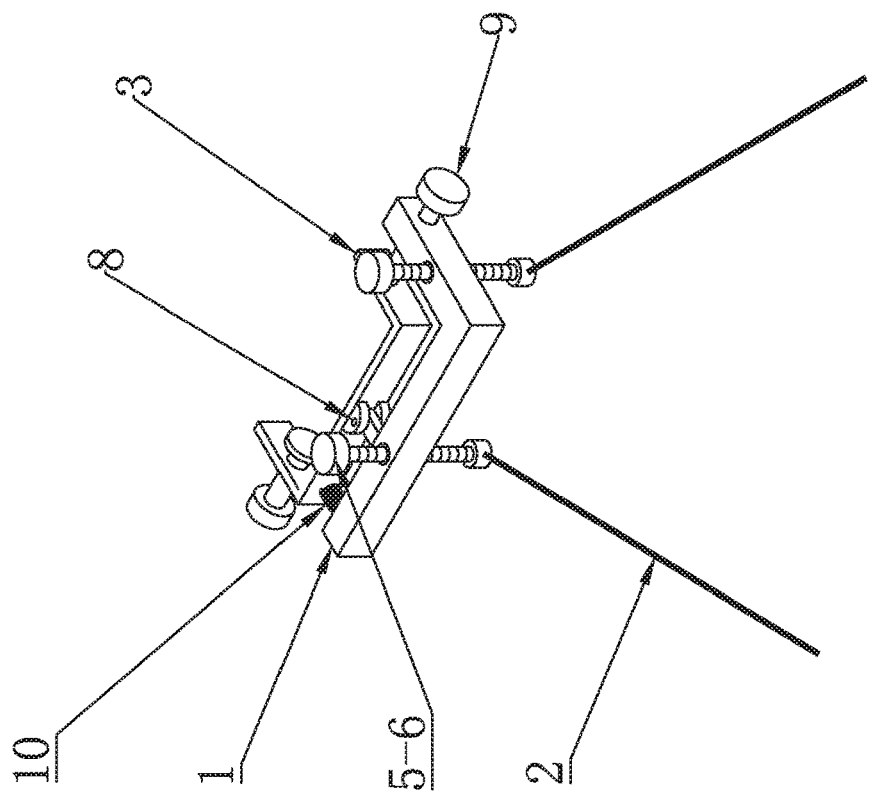
FIG. 21 is a schematic structural diagram of Embodiment 18 of the present invention.

As shown in FIG. 21, the fundamental structure of this embodiment is same as that of Embodiment 16. The difference therebetween is as follows: The first pedestal leveling device, that is, the staff alignment device, is formed by two vertical screws 5-6 in threaded connection with the first pedestal 1, and one end of each vertical screw 5-6 is rotatably connected to the top end of the corresponding support leg 2.

A working process of Embodiment 18 is basically same as that of Embodiment 16.

Embodiment 19

Figure 22:
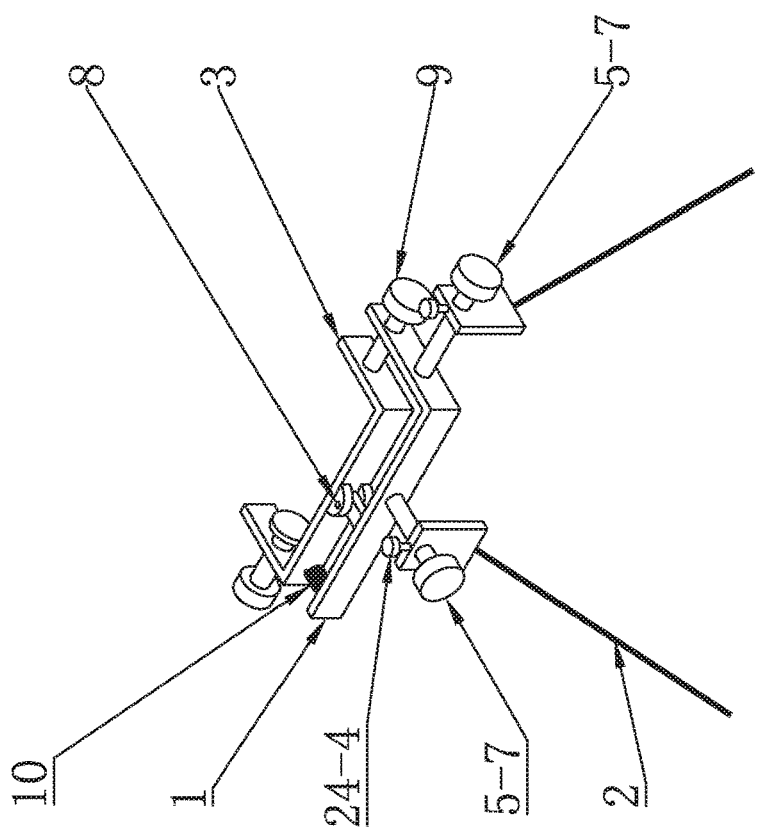
FIG. 22 is a schematic structural diagram of Embodiment 19 of the present invention.

As shown in FIG. 22, the fundamental structure of this embodiment is same as that of Embodiment 17. The difference therebetween is as follows: The first pedestal leveling device is formed by two horizontal pull rods 5-7 securely connected to the first pedestal 1, the top ends of the support legs 2 are sleeved to the horizontal pull rods 5-7 respectively, and a horizontal pull rod locking member 24-4 is disposed on each sleeve joint.

A working process of Embodiment 19 is basically same as that of Embodiment 12. A difference lies in that, in the case where the bottom ends of the support legs 2 are anchored to the ground and the length of the support legs 2 is fixed, a distance between the top end of each support leg 2 and the first pedestal 1 is directly adjusted by means of fine adjustment of the horizontal pull rods 5-7 and the locking members 24-4, such that the surveying staff 40 achieves a vertical state.

Embodiment 20

Figure 23:
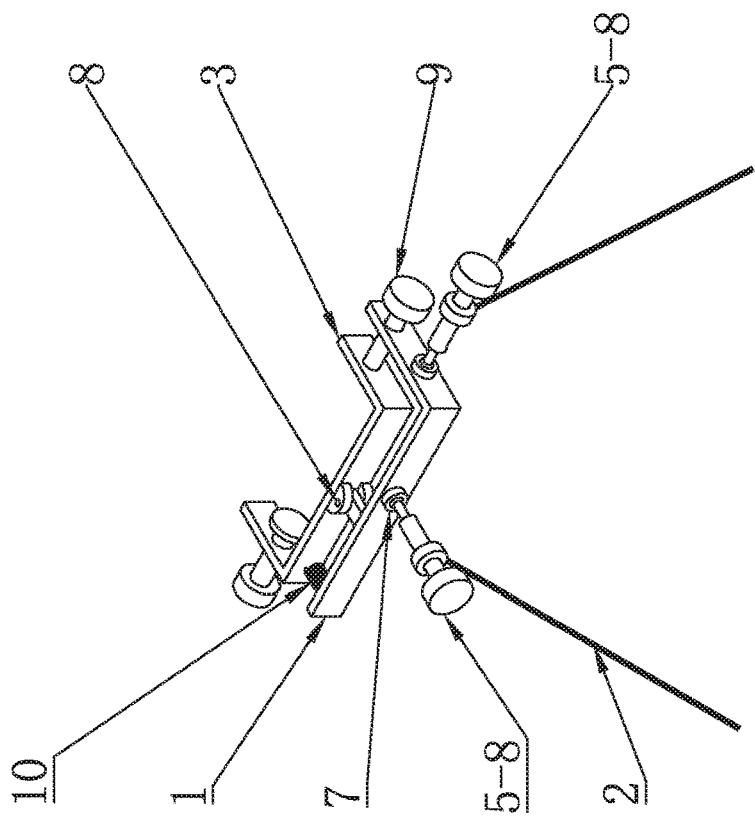
FIG. 23 is a schematic structural diagram of Embodiment 20 of the present invention.

As shown in FIG. 23, the fundamental structure of this embodiment is same as that of Embodiment 19. The difference therebetween is as follows: The first pedestal leveling device is formed by two horizontal screws 5-8 rotatably connected to the first pedestal 1, and the top ends of the support legs 2 are in threaded connection with the horizontal screws 5-8 respectively.

A working process of Embodiment 20 is basically same as that of Embodiment 12. A difference lies in that, in the case where the bottom ends of the support legs 2 are anchored to the ground and the length of the support legs 2 is fixed, a distance between the top end of each support leg 2 and the first pedestal 1 is directly adjusted by means of fine adjustment of the two horizontal screws 5-8, such that the surveying staff 40 achieves a vertical state.

The foregoing embodiments except Embodiment 15 are applicable to coded level staffs having electronic readings and conventional self-reading centimeter-grade (or millimeter-grade) level staffs. The openings on the first pedestal 1, the second pedestal 4, and the staff fixture 3 are provided so as to avoid shielding electronic readings of a coded-class level staff. For example, if the level staff 40 is classified as the conventional self-reading centimeter-grade (or millimeter-grade) staff, the first pedestal 1, the second pedestal 4, and the staff fixture 3 may all be annularly closed, provided that the processing and mounting requirements can be met.

What is claimed is:

1. A surveying stand for adjusting an angle of a staff, comprising:
    a first pedestal;
    a plurality of support legs connected to the first pedestal;
    a staff fixture disposed in the first pedestal; and
    a staff alignment device connected to the first pedestal;
    wherein the staff fixture is configured to rotate horizontally relative to the first pedestal;
    wherein a rotation adjustment device for adjusting a rotation angle of the staff fixture is arranged between the first pedestal and the staff fixture,
    wherein the plurality of support legs are two support legs, and the staff alignment device is a first pedestal leveling device connected to the plurality of support legs,
    wherein the first pedestal leveling device is formed by two horizontal screws rotatably connected to the first pedestal; and
    wherein top ends of the support legs are in threaded connection with the horizontal screws, respectively.

2. The surveying stand for adjusting the angle of a staff according to claim 1, comprising a second pedestal disposed inside the first pedestal, wherein the first pedestal and the second pedestal are both with an opening and have a same opening orientation, and wherein the staff alignment device is also a second pedestal leveling device connected to the first pedestal.

3. The surveying stand for adjusting the angle of a staff according to claim 2, wherein the second pedestal leveling device is arranged in such a manner that the second pedestal is connected to the first pedestal via a spring, and two mutually perpendicular second horizontal screws are in threaded connection with the first pedestal.

4. The surveying stand for adjusting the angle of a staff according to claim 2, wherein the second pedestal leveling device is formed by two mutually perpendicular second horizontal screws in threaded connection with the first pedestal, wherein a front end of each second horizontal screw is connected to a horizontal slider, and wherein the horizontal slider is disposed in a horizontal slide rail provided on an outer lateral surface of the second pedestal.

5. The surveying stand for adjusting the angle of a staff according to claim 2, wherein the second pedestal leveling device is formed by two mutually perpendicular horizontal pull rods slidably connected to the first pedestal;
    wherein horizontal pull rod locking members are disposed on the first pedestal; and
    wherein each of the horizontal pull rods is securely connected to the second pedestal via a first rigid spring coaxial with the horizontal pull rod.

6. The surveying stand for adjusting the angle of a staff according to claim 2, wherein the second pedestal leveling device is formed by a second horizontal screw in threaded connection with the first pedestal;
    wherein the front end of the second horizontal screw is rotatably connected to the second pedestal;
    wherein a slide way axially parallel to the second horizontal screw is disposed on the first pedestal; and
    wherein the second pedestal is placed on the slide way; a third horizontal screw perpendicular to the second horizontal screw is in threaded connection with the second pedestal, and a front end of the third horizontal screw is rotatably connected to a third pedestal, the third pedestal also being with an opening and having a same opening orientation as the second pedestal.

7. The surveying stand for adjusting the angle of a staff according to claim 2, wherein the staff fixture is disposed inside the second pedestal and is rotatably connected to the second pedestal via a vertical shaft; and
    wherein the rotation adjustment device is formed by a fastening screw and a spring connecting the second pedestal and the staff fixture, the fastening screw being in threaded connection with the second pedestal and a front end of the fastening screw being located between the second pedestal and the staff fixture.

8. The surveying stand for adjusting the angle of a staff according to claim 2, wherein the staff fixture is disposed inside the second pedestal and is rotatably connected to the second pedestal via a vertical shaft; and
    wherein the rotation adjustment device is formed by a fastening screw in threaded connection with the second pedestal, the fastening screw being rotatably connected to the staff fixture via a second rigid spring.

9. The surveying stand for adjusting the angle of a staff according to claim 2, wherein the rotation adjustment device is formed by a handle disposed on one end of the second pedestal at its inner side and a gear connected to the handle;
    wherein a curved slide vane is provided on a side opposite to the gear inside the second pedestal; and
    wherein outer sides of the staff fixture are respectively provided with a curved rack capable of meshing with the gear and a curved slide rail matching the curved slide vane.

10. The surveying stand for adjusting the angle of a staff according to claim 1, wherein the staff fixture is disposed inside the first pedestal and is rotatably connected to the first pedestal via a vertical shaft; and
    wherein the rotation adjustment device is formed by a fastening screw and a spring connecting the first pedestal and the staff fixture, the fastening screw being in threaded connection with the first pedestal and a front end of the fastening screw being located between the first pedestal and the staff fixture.

11. The surveying stand for adjusting the angle of a staff according to claim 1, wherein the staff fixture is disposed inside the first pedestal and is rotatably connected to the first pedestal via a vertical shaft; and
    wherein the rotation adjustment device is formed by a fastening screw in threaded connection with the first pedestal, the fastening screw being rotatably connected to the staff fixture via a second rigid spring.

12. The surveying stand for adjusting the angle of a staff according to claim 1, wherein the rotation adjustment device is formed by a handle disposed on one end of the first pedestal at its inner side and a gear connected to the handle;

wherein a curved slide vane is provided on a side opposite to the gear inside the first pedestal; and wherein outer sides of the staff fixture are respectively provided with a curved rack capable of meshing with the gear and a curved slide rail matching the curved slide vane.

\* \* \* \* \*

UNITED STATES PATENT AND TRADEMARK OFFICE
CERTIFICATE OF CORRECTION

PATENT NO. : 11,402,054 B2
APPLICATION NO. : 16/081037
DATED : August 2, 2022
INVENTOR(S) : Yanchun Liu et al.

It is certified that error appears in the above-identified patent and that said Letters Patent is hereby corrected as shown below:

On the Title Page

Item (54) and in the Specification, Column 1, Line 1-2, the last term in the title reading -SCALE- should read --STAFF--

Signed and Sealed this
Thirteenth Day of December, 2022

Katherine Kelly Vidal
*Director of the United States Patent and Trademark Office*